United States Patent [19]

Mead et al.

[11] 3,721,528
[45] March 20, 1973

[54] METHOD AND APPARATUS FOR MEASURING THE AMOUNT OF A COMPONENT IN A BIOLOGICAL FLUID

[76] Inventors: Louis W. Mead, 38 Somerset Road, Lexington, Mass. 01706; Marshall E. Deutsch, 41 Concord Road, Sudbury, Mass. 01776

[22] Filed: June 4, 1970

[21] Appl. No.: 43,488

[52] U.S. Cl. ............... 23/230 B, 23/253 R, 23/259, 206/47 A, 250/106 T
[51] Int. Cl. ...... G01n 33/16, G01n 23/12, G21h 5/02
[58] Field of Search ...... 23/230 B; 424/1, 79; 250/83, 250/106; 206/47 A

[56] References Cited

UNITED STATES PATENTS

| | | | |
|---|---|---|---|
| 3,376,114 | 4/1968 | Eberle | 23/230 B |
| 3,451,777 | 6/1969 | DiGiulio | 23/230 B |

Primary Examiner—Morris O. Wolk
Assistant Examiner—R. E. Serwin
Attorney—Cifelli, Behr and Rhodes

[57] ABSTRACT

An improved mode of preparing certain reagents utilized in the measurement of components of biological fluids. In the general mode contemplated, there is added to the biological fluid, which normally contains a binder (i.e. a protein) capable of binding the component to be measured, a combination of a component essentially similar to that which is to be measured as present in the biological fluid but modified to act as a tracer (by reason of its optical or radio-active properties) and an adsorbent. The tracer modified component is added in an amount greater than that capable of being bound by the binder present in the fluid. The adsorbent material is added to remove the unbound components, the adsorbent removed, and the amount of tracer in the liquid phase measured.

The improvements comprise the use of a milder adsorbent then theretofore used and a modification in the construction of the vials to carry out the measurements.

8 Claims, 6 Drawing Figures

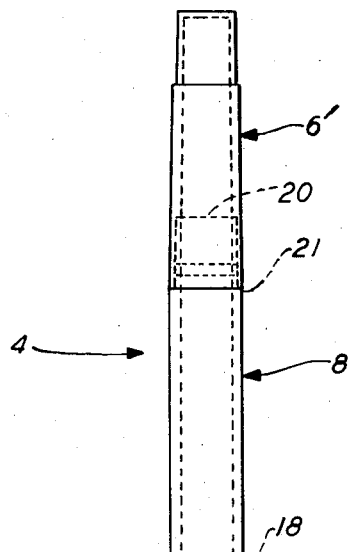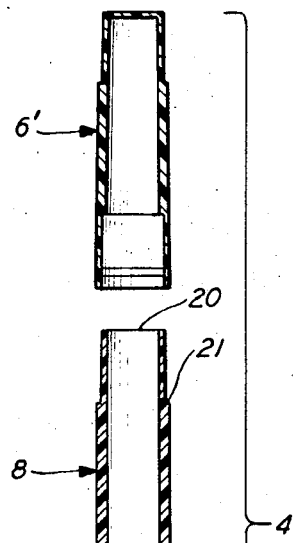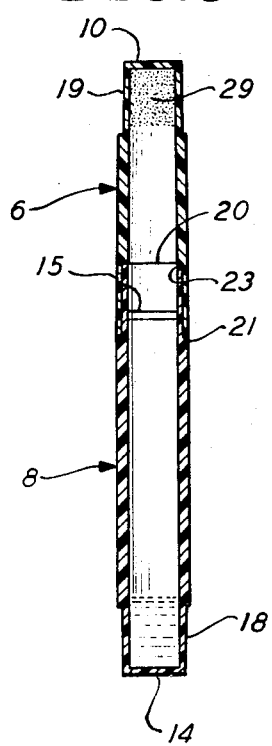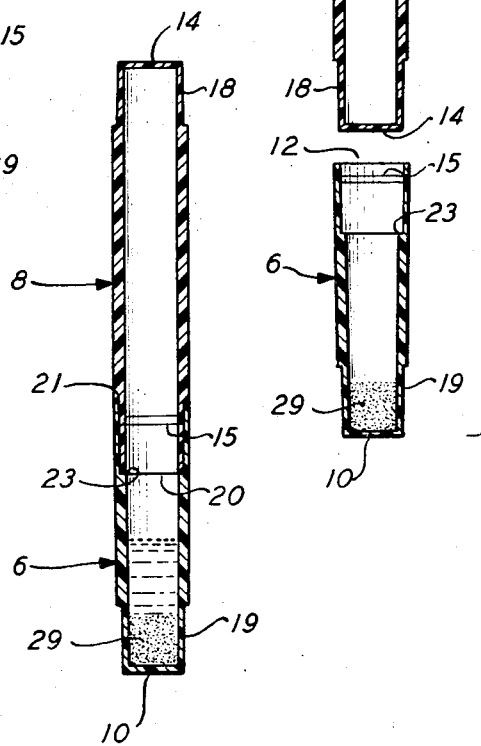

METHOD AND APPARATUS FOR MEASURING THE AMOUNT OF A COMPONENT IN A BIOLOGICAL FLUID

DESCRIPTION OF THE PRIOR ART

The general method of the present invention is described in the co-pending U.S. Pat. application of Louis W. Mead, Ser. No. 757,340, filed Sept. 4, 1968.

In this method there is utilized a tube having two separable vials, a large vial containing an aqueous phase comprising a buffer and a tracer and a smaller vial containing suitably treated charcoal or ion exchange resin. In carrying out the test a sample of the biological fluid to be tested is added to the liquid phase, the solid phase added thereto and the components mixed by shaking. The vials utilized are so constructed that the base and the mouth of the large vial will mate internally and externally respectively with the mouth of the small vial containing the solid.

Upon thorough mixing the vials are centrifuged, short end down, the vials reversed and the amount of tracer in the clear liquid measured by conventional means. Examples of the test solutions and adsorbents utilized are summarized herein below.

TABLE I

| Common Name of Test | Reference | Liquid | Solid |
|---|---|---|---|
| Charcoal T-3 Ratio (Unsaturated Thyroxine-Binding-Globulin) Test | L.E. Braverman et al. JAMA Feb. 13, 1967 Vol. 199 No.7 pp 469–472 | 2 ml. H$_2$O containing I$^{125}$ triiodothyronine, pH 7.4, barbital buffer, preservative-bovine serum, albumin and patient's serum (½ ml.) | 6.06 mg. particulate charcoal (400–1000 mesh), coated with 0.54 mg. hemoglobin and 58.4 mg. lactose |
| Unsaturated Iron-Binding Capacity of Plasma | V. Herbert et al. J. Lab. Clin. Med. Mat, 1966 Vol.67 No.5 pp 855–862 | 1 ml. pH7.4 Tris (hydroxy methyl) aminomethane chloride buffer 0.5 ml. patient's plasma, 0.5 ml. ferrous ammonium sulfate labeled with Fe$^{59}$Cl$_3$ (containing 3 micrograms Fe) | 50 gm. particulate charcoal coated with 5 mg. hemoglobin, lactose |
| Intrinsic Factor | C. Cottlieb et al. Blood 25, 875 (1965) | 2 ml. 0.85% NaCl, 0.1 ml. gastric juice, 0.1 ml. serum containing antibody to IF, 7.5 mg. Co$^{60}$ Vitamin B-12 | 50 mg. particulate charcoal coated with 10 mg. of bovine serum albumin, fibrinogen or dextran |
| Serum Vitamin B-12 | K.S. Lau et al. Blood 26, 202 (1965) | 1.5 ml. 0.9% NaCl, 0.5 ml. patient's serum, 0.5 ml. 0.25 N HCl, 0.5 ml. solution of 500 picograms Co$^{57}$ Vitamin B-12, 0.5 ml. solution of 5 micrograms Intrinsic Factor | 50 mg. particulate charcoal coated with 10 mg. bovine serum albumin |
| Insulin Assay | V.Herbert et al. J.Clin Endocrinol 25, 1375 (1965) | 2.9 ml of 350 mg albumin/100 ml H$_2$O 0.5 ml of 20 micrograms I$^{131}$ insulin, 0.1 ml of patient's serum, 0.5 ml of a solution of serum containing antiinsulin antibody diluted 1:10$^5$ | 50 mg particulate charcoal coated with 5 mg dextran 80 |
| Total Thyroxine | General Reference: B.E.P.Murphy et al. J.Clin Endocrinol 26, 24 (1966) | Same as T-3 but instead of patient's serum contains dried alcoholic extract (T-4) of 0.1 ml patient's serum plus 0.5 ml of a 1:20 dilution of standard serum | Same as T-3 |
| T-3 by Resin | General Reference: M.L. Mitchell J.Clin Endocrinol Metab. 68, 662-701 (1961) | Same as Charcoal T-3 H$_2$O with I$^{131}$ triiodothyronine, pH 7.4, tris buffer and 0.5 ml. patient's serum | Amberlite CG 400 resin (polystyrene quaternary ammonium resin) in chloride cycle (Rohm & Haas), or Duolite A-40 (Chem. Process Co.) or DOWEX 1 (Dow Chemical) |

While the technique of the prior art constitutes a considerable improvement over the methods used theretofore, it suffers from certain disadvantages.

Strict control of time and temperature are required in order to obtain reproduceable results and methods of providing such control are indeed set forth in the disclosure thereof. The chief reason for strict time control is that the adsorbents used are very avid and if the test is run for too long a time the adsorbent will tend to remove from the biological fluid some of the component which it is desired to measure thus giving rise to non-reproducibility. Since all quantities to be measured in these tests are in any case very small such over adsorbance can very readily give rise to false results.

The reagent must be shipped in two phases. While theoretically, it would be possible to combine the components of the liquid phase with those of the solid phase, the quantity of solid adsorbent used is so small that the resulting "active" solid phase could not be readily handled, giving rise to non-reproducibility of results.

In view of the small quantities to be measured in the measurement step of the procedure centrifugation must always be "short end down" to enable measurements to be made, upon reversal in the long end of the tube in order to achieve transmittance reproducibility.

In view of the nature of the juncture between the short vial and the long vial of the prior art the maximum amount of total liquid phase which may be used in the test is limited to that which will fit into the short end since larger amounts could leak out during the centrifugation step.

Finally the construction of the prior art tubes require the use of a lubricant in order to attain a measure of seal security. This gives rise to possible inaccuracies due to contamination by the lubricant.

SUMMARY OF THE INVENTION

The improvements of the present invention comprise using a mild adsorbent in place of the avid adsorbents of the prior art. Thus the adsorbent will not remove the biological fluid component which is desired to measure. Hence, the time of contact in the reaction is no longer critical, a 20 fold difference in contact time appears to have no reasonable effect on the results of the test. A surprising and most advantageous finding is that the process is also substantially independent of temperature variations. Ranges of 5° to 37°C have been found effective with no undesired variation in the result.

The use of a mild adsorbent requires and permits the use of greater quantities thereof. In place of preparing and shipping the test materials in two separate phases, the test components are suspended in an aqueous suspension, dispensed into a vial and freeze-dried to give a substantially stable, single phase solid reagent of manageable quantity and texture. The apparatus is also improved by providing an annular protrusion around the inner circumference of the small end of the tube. This protrusion acts as a highly efficient ring seal. This mode of construction has two significant advantages. The efficiency of the seal permits the centrifugation of quantities of liquid larger than that which could fit into the small end of the tube. The mode of construction also permits the axial cross-sectional dimensions of the large and small ends to be identical in all respects except length. Thus, it makes no difference if the tubes are centrifuged "short end down" or "long end down" since, provided the quantity of liquid is less than the volume of the short end, the resulting measurements will be identical whether taken through the long end or the short end of the tube.

An incidental advantage of this mode of construction appears in that the cap used for the long vial may be identical to the short vial used as a container for the reagent.

BRIEF DESCRIPTION OF THE SEVERAL VIEWS OF THE DRAWINGS

Further advantages and objects of the invention will be apparent from the following description and drawings, in which:

FIG. 1 is a view in elevation of a preferred embodiment of the container package of the present invention made up of three parts for storage and shipment to provide two separate closed compartments in one of which is secured the solids and in the other of which is empty;

FIG. 2 is an exploded cross-sectional elevational view of the container package of FIG. 1 showing the three parts of the package disassembled from each other;

FIG. 3 is a view like FIG. 1 but in which the solids-containing part of the package has been removed from its storage and shipping position with respect to the larger, empty end part and said two parts have been reassembled for carrying out a test to form a single compartment at the upper part of which is secured the solids and in the lower part of which is located an aqueous solution containing the fluid under test;

FIG. 4 is a view like FIG. 3 but in which the reassembled container has been inverted to cause the liquid to flow into contact with the solids to disperse them in the liquid;

DETAILED DESCRIPTION OF THE DRAWINGS

Figure 5:
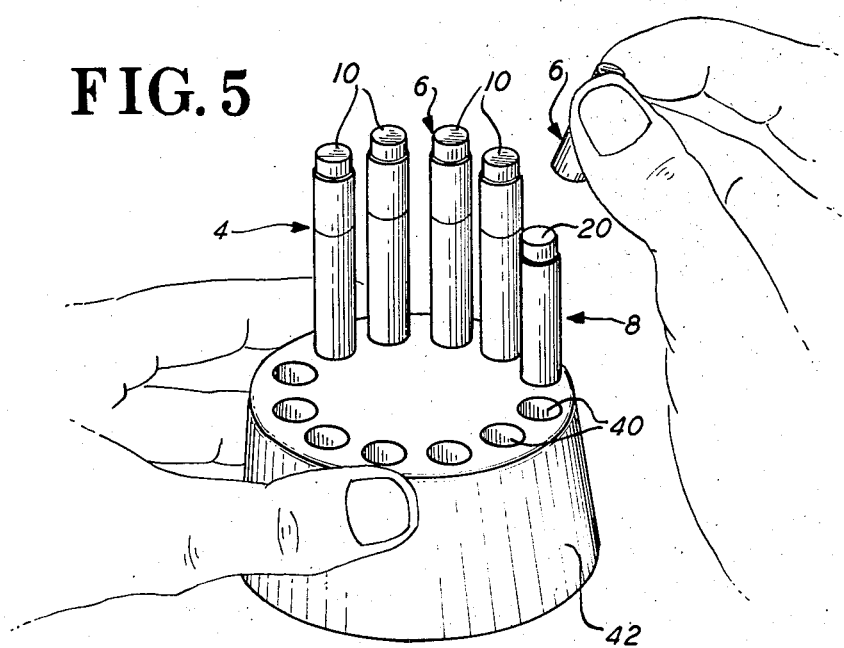
FIG. 5 is a view in perspective of the liquid-containing parts of a plurality of the container packages of FIG. 1 located in the wells of a multi-well temperature block after they have been disassembled for testing and showing the solids-containing part of one of the containers being reassembled over the mouth of its liquid-containing part during testing.
Figure 6:
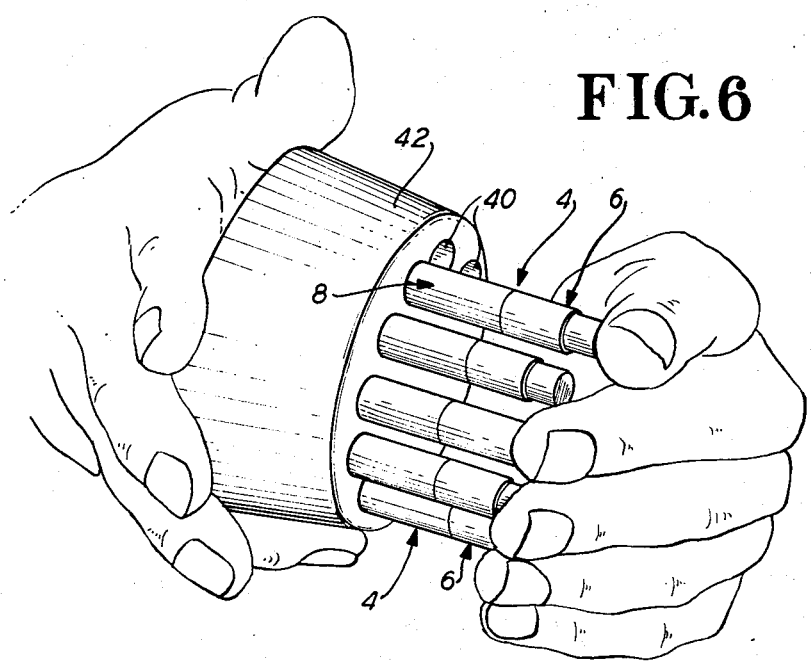
FIG. 6 is a view like FIG. 5 showing a plurality of the containers, including a control and a plurality of specimens being simultaneously inverted, after all the solids-containing parts have been reassembled over the mouths of the liquid-containing parts of FIG. 5.

Referring to the drawings, 4 designates a container package embodying the invention. It comprises a relatively rigid, straight tubular vial of translucent or transparent, molded plastic made up of a shorter part 6 and a longer part 8 and a cap 6', identical to the shorter part 6.

The shorter vial 6 is closed at one end 10 by an end wall integral with the vial and open at its other end 12. It has a very slight internal and external inward taper from the open end to the closed end thereof and the open end portion thereof has a slightly enlarged internal diameter at 23 (FIG. 2) slightly above the enlarged diameter 23, below mouth 12 is located a circumferential annular protrusion 15 which acts as a seal when either end portion 18 or mouth portion 20 of longer tube 8 is inserted thereinto. The longer vial 8 is also closed at one end 14 by an end wall integral with said vial. Shorter vial 6 is adapted to be removably mated over the reduced, slightly tapered, closed end portion 18 of the long vial 8 with a tight press fit, as shown in FIG. 1, which is the manner in which the two vials may be assembled during shipment and storage, with the reduced, slightly tapered open end portion 20 of the longer vial 8 being closed and sealed by a second removable, short vial 6' of construction identical to that of short vial 6, In effect, the longer vial 8 forms a cap for the shorter vial 6.

The open mouth 12 of the shorter vial 6 is also adapted to be removably mated over the reduced slightly tapered open end portion 20 of the longer vial 8 with a tight sealing press fit (FIGS. 3, 4 and 5) engendered by seal ring 15 after disassembly of vial 6 from the closed end of vial 8 and of cap 6' from the open end of vial 8 (FIG. 2), which is the manner in which the two vials are reassembled in carrying out a test.

Within the shorter vial 6 thereof is located a measured quantity of a finely divided particulate solid adsorbent or absorbent material 29 upon which is adsorbed the reagent in a manner further described herein below.

The solids in vial 6 are packaged, shipped and stored in the container, assembled as shown in FIG. 1 with the long vial 8 forming a closure for tightly sealing the short vial 6, containing the solids, and the long vial 8, being tightly sealed by the cap 6'.

A plurality of the containers 4 each containing solid components, as aforesaid, may be conveniently shipped as a package in a single capped container (not shown).

The dimensions of base 19 of vials 6 and 6' are identical with those of base 18 of vial 8.

DESCRIPTION OF THE PREFERRED EMBODIMENTS

In preparing the reagents used in the improved methods of the present invention an aqueous suspension of the components is prepared. This suspension will contain the tracer modified component to be measured and the adsorbent material in suitable proportions. Optionally, but preferably there is also added a buffer and an antifoam reagent. The suspension is made as dense as practicable and dispersed into the small vials 6 and freeze-dried to remove the water. The reagent powder is then covered, suitably with a thin plastic film and the base 14 of the longer vial 8 inserted into mouth 12 of small vial 6 and mouth 20 capped with capping vial 6'. The assembled containers are then ready for use.

It is the particular advantage of this improved modification of the similar procedure of Mead that any low avidity adsorbent may be used. There may be used for example, calcium carbonate, magnesium carbonate, barium sulfate, pyrogenic silica, potato starch, Kaolin and other adsorbents of similar avidity which are not water soluble.

In addition to the active components of the reagent mentioned above, certain preservatives may be added. These preparations include bacterial growth inhibitors such as methyl or propyl p-hydroxy benzoates, free radical scavengers such as phenol, ultraviolet absorbers such as p-amino benzoic acid and the like.

As buffering agents there may be used sodium barbital, sodium or potassium phosphate, tris (hydroxymethyl) amine methane and the like. Salts may be added to maintain the osmotic strength of the mixture at a desired level, sodium chloride, potassium iodide or the like have been found suitable.

In order to facilitate reconstitution or to suppress foaming, wetting or anti-foaming agents may also be added, such agents include alkyl phosphates, General Electric Antifoam 10 and the like.

A colorant neutral to the contemplated reactions may also be added in order to distinguish between different reagents which may be on the test bench at the same time.

A variant on this theme is the use of a reagent which will not affect the course of the test but will change color in the presence of protein. Bromo phenol blue is such an indicator. The color of the reagent will serve to indicate whether the test serum has been added to the reagent thus serving as a guard against accidental blank runs.

In operating the test itself distilled water is inserted into the long vial 8, 3.0 ml. is a suitable amount and a small, measured quantity of the fluid and test, suitably serum, or a reference fluid or standard serum is added thereto. 0.2 ml. is a suitable quantity. Vial 6 is then separated from vial 8 which is set into holes 40 in block 42 with end 18 down. The protective plastic film is then removed from tube 6 and tube 6 inverted over mouth 20 of tube 8 and pushed home so that flange 21 is seated on shoulder 23. After all the tubes in the test batch have been so set, they are shaken as shown in FIG. 8 until the particulate matter 29 appears uniformly distributed. The shaking time is not critical, two minutes shaking is usually adequate.

It is a particular advantage of the present invention that wide variations in incubation time and temperature are permissable without affecting reproducibility of results. It has been found convenient to permit the suspensions to stand at from about 15° to about 30°C or from about 5 to about 30 minutes. Incubation at ambient temperature for about 10 minutes has been found satisfactory.

The combined vials are then centrifuged, preferably, but not essentially with end 18 down. The tubes are then inverted and the requisite radio activity or optical density measurements carried out on the liquid phase in the long tube. It is the surprising and advantageous result of this invention that vial 6 does not need to be separated from vial 8 at this stage, as was the case in the prior art since the particulate material was sufficiently well compacted.

In another modification of the improvement of the present invention the suspension containing the reagent components is dispensed into long vial 8 freeze-dried and covered if desired, with a thin plastic film. Vial 8 is then capped with empty vial 6.

In running the reaction water and the test serum are added to vial 8, the plastic film, if present pushed down into the vial to allow the aqueous components to contact reagent 29, and the rest of the test carried out as before.

This modification is particularly suitable for use with radioactive tracers since it avoids the possibility of waste contamination by the plastic film or of aerial contamination by the powdery reagent between the time of removal of the plastic film and mating of vials 6 and 8.

In certain tests the biological fluid under test does not normally contain the binder for the component to be measured. In these cases, the binder is added to the reagent 29. As noted above, the amount of binder utilized in tests of this nature is insufficient to bind both the tracer and the component to be measured. In most cases equilibration will occur between the binder and the tagged and un-tagged component. In these cases the binder is added to the aqueous suspension used for the preparation of the reagent 29. Where it is preferable to have no pre-bound combination of binder and tracer, a separate combination of absorbent and binder is prepared in a similar manner to that set forth above, and the binder/absorbent combination separately, for example in another vial such as 6. After the reagent and the aqueous solution of the biological fluid are mixed in accordance with either of the above modifications, the binder/absorbent reagent is added and the test carried out as previously; i.e. the bound tracer-plus-(component to be measured) is absorbed by the absorbent, and a proportion of the tracer, being unbound, remains un-absorbed.

EXAMPLE

A T-3 (Unsaturated Thyroxine-Binding-Globulin Capacity) test for obtaining a measure of the amount of thyroid hormone in the blood sera of a number of patients was carried out as follows: to 13.0 grams of succinic acid, 33.6 grams of sodium barbital and 270 grams of magnesium carbonate were added a solution of 2.86 micrograms of triiodothyronine labeled with 0.32 millicurie of $I^{125}$ and 1.2 milliliters of General Electric Antifoam 10 in 1,070 milliliters of distilled water. The suspension was stirred thoroughly to break up lumps and was then dispensed in two-milliliter aliquots into small tubes. The contents of the small tubes were then frozen and the water removed by freeze-drying.

After freeze-drying, the small tubes were assembled to larger tubes by plugging the open ends of the small tubes with the closed ends of the larger tubes. One-inch squares of polyethylene film 0.002-inch thick were inserted between the small and large tubes to protect the bottom of the large tubes from possible contamination. The assemblies were then stored at room temperatures (15°–25°C.) for 2 months.

To perform the tests, twelve of these assemblies were placed in a test-tube rack. Each assembly was marked with a number identifying the serum which was to be tested in it. To each tube was then added 0.2 milliliter of the appropriate reference serum or patient's serum and 3.0 milliliters of distilled water. The short tubes were then removed from the bottoms of the long tubes, the protective squares of polyethylene film were discarded, and the short tubes were connected, open end to open end, to the long tubes. After all assemblies had been reconnected in this manner, they were all shaken until the particulate matter in them appeared to be uniformly suspended. The reaction mixtures were allowed to stand for approximately ten minutes at a room temperature of 20°C. At the end of ten minutes, the vial assemblies were all centrifuged for five minutes and were then inverted to separate the clear supernatant fluid from the compacted solid material. Since the compacted solid material remained firmly in place, it was not necessary to separate the tubes as described in the method of the prior art to which reference is made above.

Counts were then made of the radioactivity in the clear supernatant fluids and these counts were recorded. The count obtained for the clear supernatant fluid of each patient test was then divided by the count obtained for the clear supernatant fluid of the test of a normal reference serum, and the resulting ratio was recorded. For a patient population which we have studied, this ratio is 0.86 to 1.06 for euthyroid patients, greater than 1.06 for hypothyroid patients and less than 0.86 for hyperthyroid patients.

When a normal reference serum is not available, a count is made at this point of the total radioactivity in each tube, and the normality or lack of normality of the patients' sera is determined by the ratio of the radio activity in the clear supernatant fluid of each tube after centrifuging to the total radioactivity in each suspension before centrifuging. For a patient population which we have tested, this ratio ranged from 0.29 to 0.38 for euthyroid patients, but was less than 0.29 for hypothyroid patients and more than 0.38 for hyperthyroid patients.

What is claimed is:

1. In a method of measuring the amount of a component in a biological fluid in which an aqueous suspension, containing (1) said component in or from a measured sample of said fluid, (2) a measured amount of a tracer labeled compound, (3) a compound which has the property of binding said component and said tracer labeled compound thereto and which is present in an amount insufficient to bind all said component and tracer compound so that some of said tracer compound is in a free state and some is bound to said binding compound, and (4) a solid particulate adsorbent for selectively adsorbing the free unbound tracer labeled compound to thereby separate the bound from the unbound, are left in contact with each other during a predetermined incubation period to permit said adsorption to occur, followed by separating the solid adsorbent containing unbound tracer compound from the liquid containing the bound component and bound tracer compound and measuring the tracer intensity of at least one of said separated adsorbent and liquid, the improvement which comprises i. preparing an aqueous suspension comprising
      a. a tracer labeled component, and
      b. a moderately active adsorbent;
   ii. freeze-drying a predetermined amount of said suspension to prepare the dry reagent;
   iii. preparing an aqueous solution of a small sample of the biological fluid;
   iv. mixing the reagent and the aqueous solution of biological fluid.

2. A method according to claim 1, wherein said tracer labeled compound is a radioactive labeled compound.

3. A method according to claim 1 wherein the absorbent is selected from the group consisting of magnesium carbonate, calcium carbonate, barium sulfate, pyrogenous silica and kaolin.

4. A method according to claim 1, wherein the reagent additionally comprises a buffer.

5. A method according to claim 1 wherein the reagent additionally comprises an antifoaming agent.

6. A method according to claim 1, wherein the reagent additionally comprises a fully ionized salt.

7. A method according to claim 1 wherein the reagent additionally comprises the binder for the component to be measured.

8. A method according to claim 1 comprising the additional step (V) of adding the binder for the component to be measured.

* * * * *